United States Patent
Cox et al.

(10) Patent No.: US 11,785,886 B1
(45) Date of Patent: Oct. 17, 2023

(54) ZERO-TURN-RADIUS RIDING MOWER FRONT WHEEL POSITIONING SYSTEM

(71) Applicant: Bad Boy Mowers, LLC, Batesville, AR (US)

(72) Inventors: Kenny Cox, Batesville, AR (US); Charles Bradley Covington, Batesville, AR (US)

(73) Assignee: Bad Boy Mowers, LLC, Batesville, AR (US)

( * ) Notice: Subject to any disclaimer, the term of this patent is extended or adjusted under 35 U.S.C. 154(b) by 474 days.

(21) Appl. No.: 17/008,870

(22) Filed: Sep. 1, 2020

(51) Int. Cl.
| | | |
|---|---|---|
| *A01D 34/64* | (2006.01) | |
| *A01D 67/00* | (2006.01) | |
| *B60G 3/01* | (2006.01) | |
| *A01D 101/00* | (2006.01) | |

(52) U.S. Cl.
CPC .............. *A01D 34/64* (2013.01); *A01D 67/00* (2013.01); *B60G 3/01* (2013.01); *A01D 2101/00* (2013.01); *B60G 2300/084* (2013.01); *B60G 2300/40* (2013.01)

(58) Field of Classification Search
CPC .......... A01D 34/64; A01D 67/00; B60G 3/01; B60G 2300/084; B60G 2300/40
See application file for complete search history.

(56) References Cited

U.S. PATENT DOCUMENTS

| | | | | |
|---|---|---|---|---|
| 2,857,725 | A | | 10/1958 | Canfield |
| 3,306,390 | A | * | 2/1967 | Jamme ................... B62D 61/12 180/41 |
| 3,899,037 | A | * | 8/1975 | Yuker ............... B60G 17/01925 180/41 |
| 4,363,374 | A | * | 12/1982 | Richter .............. B62D 49/0607 180/209 |
| 4,379,571 | A | * | 4/1983 | Simmons ................. B60G 5/04 280/43.23 |
| 9,387,881 | B2 | * | 7/2016 | Smith .................... B60G 11/28 |
| 10,562,364 | B2 | * | 2/2020 | Crook ............... B60G 17/0152 |

(Continued)

OTHER PUBLICATIONS

Toro; "GrandStand Multi Force 52" (132 cm) 26.5 HP 747cc EFI (72529)" accessed Dec. 15, 2020 at: https://www.toro.com/en/professional-contractor/commercial-mowers/grandstand-multi-force-stand-on-mower-72529; pp. 1-2.

(Continued)

*Primary Examiner* — Thomas B Will
*Assistant Examiner* — Julia C Tran
(74) *Attorney, Agent, or Firm* — Pillsbury Winthrop Shaw Pittman LLP

(57) ABSTRACT

A lawn mower front wheel positioning system that provides adjustment of lateral positioning of a front wheel of the mower. The front wheel positioning system includes a wheel support arm, a wheel support member, and a wheel positioning arm having an adjustable length. The wheel positioning arm having a proximal end that couples to the wheel support member and a distal end that couples to the wheel support arm. A first end of the wheel support arm couples to the front wheel. A second end of the support arm couples to the support member by way of a support arm wheel pivot that defines a wheel pivot axis. The wheel support arm and the front wheel rotate about the wheel pivot axis responsive to adjustment of the length of the wheel positioning arm.

20 Claims, 11 Drawing Sheets

(56) References Cited

U.S. PATENT DOCUMENTS

| | | | | |
|---|---|---|---|---|
| 2003/0106297 | A1* | 6/2003 | Melone | A01D 34/64 56/15.8 |
| 2008/0190682 | A1* | 8/2008 | Mahy | B60B 35/003 180/209 |
| 2010/0011733 | A1* | 1/2010 | Godfrey | A01D 34/662 56/17.5 |
| 2011/0048833 | A1* | 3/2011 | Schapf | B60G 7/006 280/124.128 |
| 2013/0291509 | A1* | 11/2013 | Weber | B60K 17/00 56/15.8 |
| 2018/0325026 | A1* | 11/2018 | Krajewski | A01D 34/82 |
| 2021/0400877 | A1* | 12/2021 | Zhao | A01D 34/66 |

OTHER PUBLICATIONS

Toro; "GrandStand Multi Force Mower With 52in or 60in Turbo Force Cutting Unit" Form No. 3435-596 Rev A, 2019; pp. 1-64.
Toro; "Grandstand Multi Force Stand-On Mower Specifications" 2019; pp. 1-4.

* cited by examiner

ZERO-TURN-RADIUS RIDING MOWER FRONT WHEEL POSITIONING SYSTEM

FIELD

Embodiments relate generally to mowing devices and more particularly to riding mower wheel positioning systems.

BACKGROUND

A lawn mower (or "mower") is a device that is used to cut (or "mow") grassy areas. A mower typically utilizes one or more rotating blades that cut grass as the mower travels across the ground. A mower often takes the form of a walk-behind mower or a riding mower (or "ride-on" mower). A walk-behind mower is typically operated by an operator that walks behind and guides the mower. Some walk-behind mowers rely on the operator pushing the mower for propulsion (often referred to as "push" mowers). Some walk-behind mowers have a drive system (or a "propulsion" system) that assists in propelling the mower (often referred to as "self-propelled" walk-behind mowers). A riding mower is typically operated by an operator that rides on the mower as it travels across the ground. A riding mower normally includes an operator support, such as a seat or platform, and a drive system that propels the mower.

A zero-turn-radius (ZTR) riding mower is a type of riding mower. A ZTR riding mower typically includes right and left control handles (or "control arms" or "drive arms" or "control levers" or "steering levers") that an operator can push and pull to cause forward or backward rotation of right and left drive wheels, independent of one another. This can enable the mower to make sharp turns with ease, even spinning the entire mower in place—hence the label "zero-turn-radius." A ZTR riding mower is often desirable for its agility, speed, and wide mowing coverage. A ZTR mower typically employs drive units, such as hydrostatic (or "hydraulic") transaxles, that selectively rotate drive wheels forward or backward in response to pushing or pulling of the control handles. A ZTR mower normally employs non-driven caster-style front wheels that support a front end of the mower. The caster-style front wheels are generally free to swivel about a vertical axis, which enables the front end of the mower to turn freely in response to selective driving of the rear wheels. ZTR mowers often take the form of sit-on ZTR mowers or stand-on ZTR mowers. A sit-on ZTR mower typically includes a seat and is designed to be operated with the operator seated in the seat. A stand-on ZTR mower typically includes a platform and is designed to be operated with the operator standing on the platform.

SUMMARY

It is generally desirable for a lawn mower (or "mower") to cut (or "mow") grass evenly, to approximately the same length. Unfortunately, achieving an even cut can be difficult, and it is not uncommon for a mower to leave an uneven cut. In some instances, an uneven cut is due to a mowing blade failing to cut the grass (e.g., the cutting blade is dull), the mowing deck and blades being uneven (e.g., the mowing deck and blades being titled), or the grass laying over as a cutting blade passes over the grass (e.g., the grass is wet or has been pushed down). In the case of grass laying over, this can be a result of the wheels of the mower compressing the grass against the ground prior to the grass being cut. For example, the front wheels of a riding mower are typically located in front of the mowing deck and blades, and, as the mower advances forward, the front wheels roll over and compress grass shortly before a cutting blade move over the grass. Ideally, the blades of grass are resilient enough to fully rebound from the compression such that they stand up for cutting by the blades. Unfortunately, the compressed blades may not fully rebound for cutting, and, as a result, blades of grass in the path of a wheel may not be cut as short as blades of grass that are not driven over. This can leave strips of relatively tall grass in an otherwise evenly cut lawn.

In many instances, mowers are equipped with mowing decks and blades that are intended to create upward airflow (or "suction") that draws the blades upward, into a standing position, to promote an even cut. Although this approach can improve the cut, it can have shortcomings. For example, each mowing deck design and blade combination may provide varying amounts of suction in different areas under the deck. If a front wheel is positioned ahead of an area of relatively low suction (or a "low suction zone"), the grass pressed down by the wheel may not be drawn into a standing position for cutting. If a front wheel is positioned ahead of an area of relatively high suction (or a "high suction zone"), the grass pressed down by the wheel may be drawn into a standing position for cutting. Accordingly, it can be desirable to position the front wheels of a mower ahead of high suction zones to promote an even cut. Although this appears to be a simple task, it can be especially difficult to achieve in a market with varying styles and sizes of mowing decks and cutting blades, and in view of the general variability of mowing conditions. For example, a single style of mower may have a given frame configuration that is used for multiple deck sizes and blade combinations. Although a front wheel position provided by a given frame configuration may provide a desirable wheel position for certain combinations of deck, blade and mowing conditions, it may not provide a desirable wheel position for other combinations of deck, blade and mowing conditions.

Provided are embodiments of a mower wheel positioning system. In some embodiments, the front wheel positioning system enables one or both of the front wheels of a mower to be moved between different positions. For example, the front wheel positioning system may enable a front wheel of a ZTR mower to be moved laterally (or "sideways") into different lateral positions. This may enable the front wheels to be moved into a position that promotes an even cut. For example, each of the front wheels may be moved right or left relative to the mowing deck such that the wheel is aligned with a high suction zone of the cutting system. In some embodiments, the front wheel positioning system includes an adjustable positioning arm that can be extended/retracted (e.g., lengthened/shortened) to adjust the position of a front wheel attached thereto. For example, the front wheel of a mower may be coupled to a front wheel support arm that is pivotally coupled to a frame of the mower by way of a hinge. An adjustable length positioning arm may be provided with one end attached to the frame and an opposite end attached to the front wheel support arm. The positioning arm may be lengthened to move the front wheel support arm and the front wheel in one direction (e.g., right or left) or shortened to move the front wheel support arm and the front wheel in an opposite direction (e.g., left or right). The ability to adjust the position of the front wheel may enable fine-tuning of the positon of the front wheel for various combinations of decks, blades and mowing conditions. For example, a manufacture may use a given adjustable front wheel style frame for mowers with different deck and blade combinations, and, for each mower manufactured using that style of frame, the manufacture may set the positioning arm length to place the front wheels into desired positions for the deck and blade combination of the mower. Moreover, if a user encounters varying combinations of deck, blade and mowing conditions, the user may adjust the positioning arm length to move the front wheels into desired positions for deck, blade and mowing conditions. Such flexibility in wheel positioning may decrease manufacturing complexity and provide users with a superior cut.

Provided in some embodiments, is a zero-turn radius (ZTR) riding mower system, that includes the following: a right front caster wheel; a left front caster wheel; a right rear drive wheel adapted to be selectively driven into rotation by a right drive unit; a left rear drive wheel adapted to be selectively driven into rotation by a left drive unit; a frame system including: a front wheel positioning system adapted to enable adjustment of lateral positioning of the right front caster wheel and adjustment of a lateral positioning of the left front caster wheel, the front wheel positioning system including: a right wheel positioning system including: a right wheel support arm; a right wheel support member; and a right wheel positioning arm having an adjustable length, the right wheel positioning arm having a proximal end pivotally coupled to the right wheel support member and a distal end pivotally coupled to the right wheel support arm, where: a first end of the right wheel support arm is coupled to the right front caster wheel, a second end of the right support arm is pivotally coupled to the right support member by way of a right support arm wheel pivot that defines a vertically oriented right wheel pivot axis, and the wheel support arm and the right front caster wheel are adapted to rotate together about the wheel pivot axis responsive to adjustment of the length of the right wheel positioning arm; and a left wheel positioning system including: a left wheel support arm; a left wheel support member; and a left wheel positioning arm having an adjustable length, the left wheel positioning arm having a proximal end pivotally coupled to the left wheel support member and a distal end pivotally coupled to the left wheel support arm, where: a first end of the left wheel support arm is coupled to the left front caster wheel, a second end of the left support arm is pivotally coupled to the left support member by way of a left support arm wheel pivot that defines a vertically oriented left wheel pivot axis, and the wheel support arm and the left front caster wheel are adapted to rotate together about the wheel pivot axis responsive to adjustment of the length of the left wheel positioning arm.

In some embodiments, the right wheel positioning arm includes a threaded linkage adapted to be rotated in a first direction to cause lengthening of the right wheel positioning arm and rotated in a second direction to cause shortening of the right wheel positioning arm, and the left wheel positioning arm includes a threaded linkage adapted to be rotated in a first direction to cause lengthening of the left wheel positioning arm and rotated in a second direction to cause shortening of the left wheel positioning arm. In some embodiments, the right front caster wheel is adapted to swivel about a vertically oriented right caster axis and to rotate about a horizontally oriented right axle axis, and the left front caster wheel is adapted to swivel about a vertically oriented left caster axis and to rotate about a horizontally oriented left axle axis. In some embodiments, the right wheel positioning system is adapted to enable adjustment of positioning of the right front caster wheel in front of cutting blades of the ZTR riding mower system such that the right front caster wheel is adapted to encounter grass to be cut ahead of a first portion of the cutting blades in a first position and is adapted to encounter grass to be cut ahead of a second portion of the cutting blades in a second position, and the left wheel positioning system is adapted to enable adjustment of positioning of the left front caster wheel in front of cutting blades of the ZTR riding mower system such that the left front caster wheel is adapted to encounter grass to be cut ahead of a first portion of the cutting blades in a first position and is adapted to encounter grass to be cut ahead of a second portion of the cutting blades in a second position. In some embodiments, the right wheel support member includes a portion of a frame weldment of the frame system, and the left wheel support member includes a portion of the frame weldment of the frame system.

Provided in some embodiments is a riding mower system that includes the following: a right front wheel; a left front wheel; a right rear drive wheel adapted to be selectively driven into rotation by a right drive unit; a left rear drive wheel adapted to be selectively driven into rotation by a left drive unit; a frame system including: a front wheel positioning system adapted to enable adjustment of lateral positioning of the right front wheel and adjustment of a lateral positioning of the left front wheel, the front wheel positioning system including: a right wheel support arm; a right wheel support member; and a right wheel positioning arm having an adjustable length, the right wheel positioning arm having a proximal end pivotally coupled to the right wheel support member and a distal end pivotally coupled to the right wheel support arm, where: a first end of the right wheel support arm is coupled to the right front wheel, a second end of the right support arm is pivotally coupled to the right support member by way of a right support arm wheel pivot that defines a vertically oriented right wheel pivot axis, and the wheel support arm and the right front wheel are adapted to rotate together about the wheel pivot axis responsive to adjustment of the length of the right wheel positioning arm, a left wheel support arm; a left wheel support member; and a left wheel positioning arm having an adjustable length, the left wheel positioning arm having a proximal end pivotally coupled to the left wheel support member and a distal end pivotally coupled to the left wheel support arm, where: a first end of the left wheel support arm is coupled to the left front wheel, a second end of the left support arm is pivotally coupled to the left support member by way of a left support arm wheel pivot that defines a vertically oriented left wheel pivot axis, and the wheel support arm and the left front wheel are adapted to rotate together about the wheel pivot axis responsive to adjustment of the length of the left wheel positioning arm.

In some embodiments, the right wheel positioning arm includes a threaded linkage adapted to be rotated in a first direction to cause lengthening of the right wheel positioning arm and rotated in a second direction to cause shortening of the right wheel positioning arm, and the left wheel positioning arm includes a threaded linkage adapted to be rotated in a first direction to cause lengthening of the left wheel positioning arm and rotated in a second direction to cause shortening of the left wheel positioning arm. In some embodiments, the right front wheel includes a caster wheel adapted to swivel about a vertically oriented left caster axis and to rotate about a horizontally oriented right axle axis, and the left front wheel includes a caster wheel adapted to swivel about a vertically oriented left caster axis and to rotate about a horizontally oriented left axle axis. In some embodiments, the right wheel positioning system is adapted to enable adjustment of positioning of the right front wheel in front of cutting blades of the ZTR riding mower system such that the right front wheel is adapted to encounter grass to be cut ahead of a first portion of the cutting blades in a first position and is adapted to encounter grass to be cut ahead of a second portion of the cutting blades in a second position, and the left wheel positioning system is adapted to enable adjustment of positioning of the left front wheel in front of cutting blades of the ZTR riding mower system such that the left front wheel is adapted to encounter grass to be cut ahead of a first portion of the cutting blades in a first position and is adapted to encounter grass to be cut ahead of a second portion of the cutting blades in a second position. In some embodiments, the right wheel support member includes a portion of a frame weldment of the frame system, and the left wheel support member includes a portion of the frame weldment of the frame system. In some embodiments, the riding mower system includes a zero-turn radius (ZTR) riding mower system.

Provided in some embodiments is a mower system that includes the following: a front wheel positioning system adapted to enable adjustment of lateral positioning of a front wheel of the mower system, the front wheel positioning system including: a wheel support arm; a wheel support member; and a wheel positioning arm having an adjustable length, the wheel positioning arm having a proximal end adapted to couple to the wheel support member and a distal end adapted to couple to the wheel support arm, a first end of the wheel support arm adapted to couple to the front wheel, a second end of the support arm adapted to couple to the support member by way of a support arm wheel pivot that defines a wheel pivot axis, and the wheel support arm and the front wheel are adapted to rotate together about the wheel pivot axis responsive to adjustment of the length of the wheel positioning arm.

In some embodiments, the proximal end of the wheel positioning arm is adapted to pivotally couple to the wheel support member, and the distal end of the wheel positioning arm is adapted to pivotally couple to the wheel support arm. In some embodiments, the wheel pivot axis is vertically oriented. In some embodiments, the wheel positioning arm includes a threaded linkage adapted to be rotated in a first direction to cause lengthening of the wheel positioning arm and rotated in a second direction to cause shortening of the wheel positioning arm. In some embodiments, the front wheel includes a caster wheel adapted to swivel about a vertically oriented caster axis and to rotate about a horizontally oriented axle axis. In some embodiments, the wheel positioning system is adapted to enable adjustment of positioning of the front wheel in front of cutting blades of the ZTR riding mower system such that the front wheel is adapted to encounter grass to be cut ahead of a first portion of the cutting blades in a first position and is adapted to encounter grass to be cut ahead of a second portion of the cutting blades in a second position. In some embodiments, the wheel support member includes a portion of a frame weldment of the frame system. In some embodiments, the riding mower system includes a zero-turn radius (ZTR) riding mower system. In some embodiments, the front wheel positioning system further includes: a second wheel support arm; a second wheel support member; and a second wheel positioning arm having an adjustable length, the second wheel positioning arm having a proximal end adapted to couple to the second wheel support member and a distal end adapted to couple to the second wheel support arm, a first end of the second wheel support arm is adapted to couple to a second front wheel of the mower system, a second end of the second support arm is adapted to couple to the second support member by way of a second support arm wheel pivot that defines a second wheel pivot axis, and the wheel support arm and the second front wheel are adapted to rotate together about the second wheel pivot axis responsive to adjustment of the length of the second wheel positioning arm.

DETAILED DESCRIPTION

In some embodiments, the front wheel positioning system enables one or both of the front wheels of a mower to be moved between different positions. For example, the front wheel positioning system may enable a front wheel of a ZTR mower to be moved laterally (or "sideways") into different lateral positions. This may enable the front wheels to be moved into a position that promotes an even cut. For example, each of the front wheels may be moved right or left relative to the mowing deck such that the wheel is aligned with a high suction zone of the cutting system. In some embodiments, the front wheel positioning system includes an adjustable positioning arm that can be extended/retracted (e.g., lengthened/shortened) to adjust the position of a front wheel attached thereto. For example, the front wheel of a mower may be coupled to a front wheel support arm that is pivotally coupled to a frame of the mower by way of a hinge. An adjustable length positioning arm may be provided with one end attached to the frame and an opposite end attached to the front wheel support arm. The positioning arm may be lengthened to move the front wheel support arm and the front wheel in one direction (e.g., right or left) or shortened to move the front wheel support arm and the front wheel in an opposite direction (e.g., left or right). The ability to adjust the position of the front wheel may enable fine-tuning of the positon of the front wheel for various combinations of decks, blades and mowing conditions. For example, a manufacture may use a given adjustable front wheel style frame for mowers with different deck and blade combinations, and, for each mower manufactured using that style of frame, the manufacture may set the positioning arm length to place the front wheels into desired positions for the deck and blade combination of the mower. Moreover, if a user encounters varying combinations of deck, blade and mowing conditions, the user may adjust the positioning arm length to move the front wheels into desired positions for deck, blade and mowing conditions. Such flexibility in wheel positioning may decrease manufacturing complexity and provide users with a superior cut.

Figure 1A:
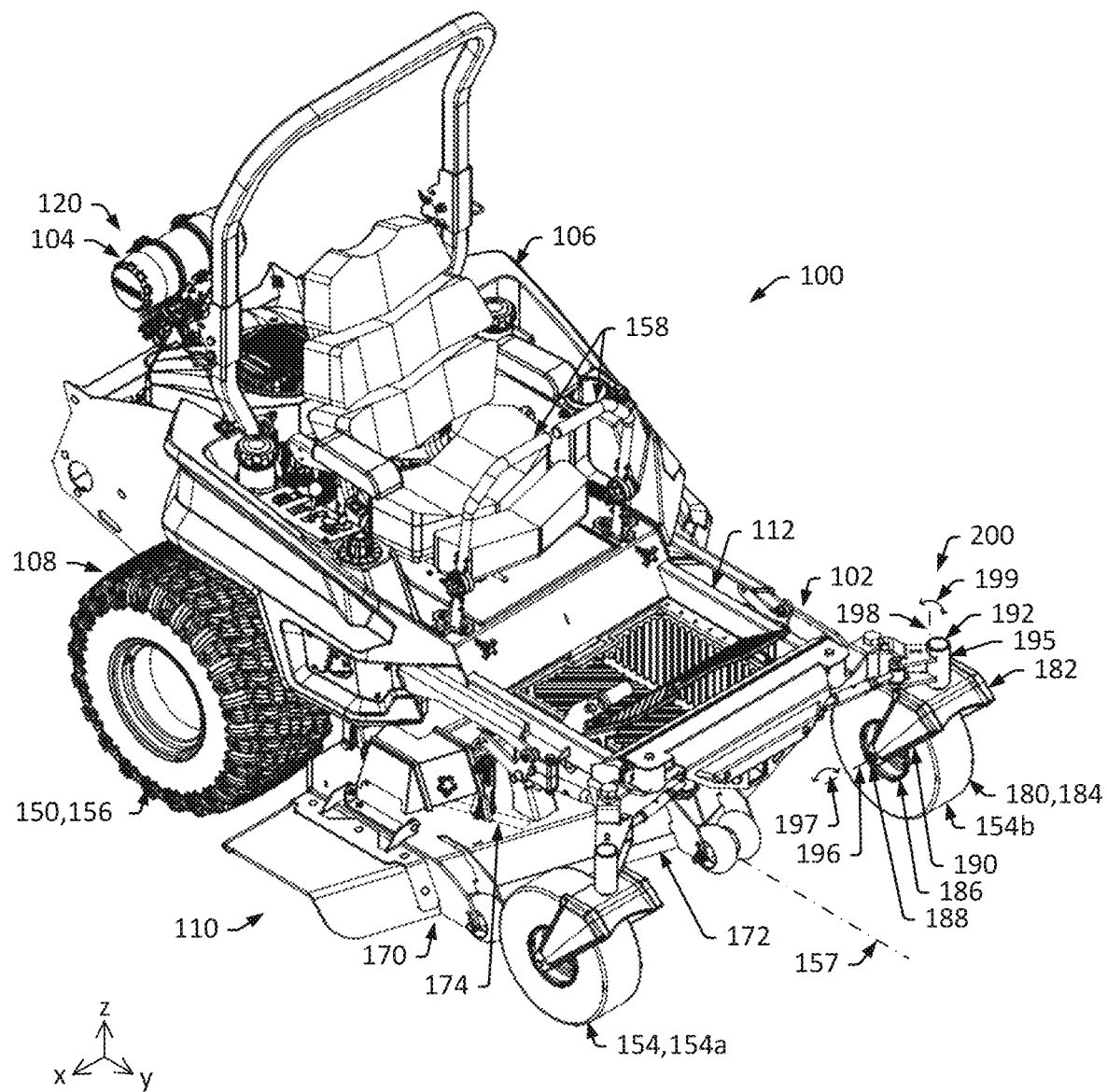
FIGS. 1A and 1B are diagrams that illustrate a mower system in accordance with one or more embodiments.
Figure 1B:
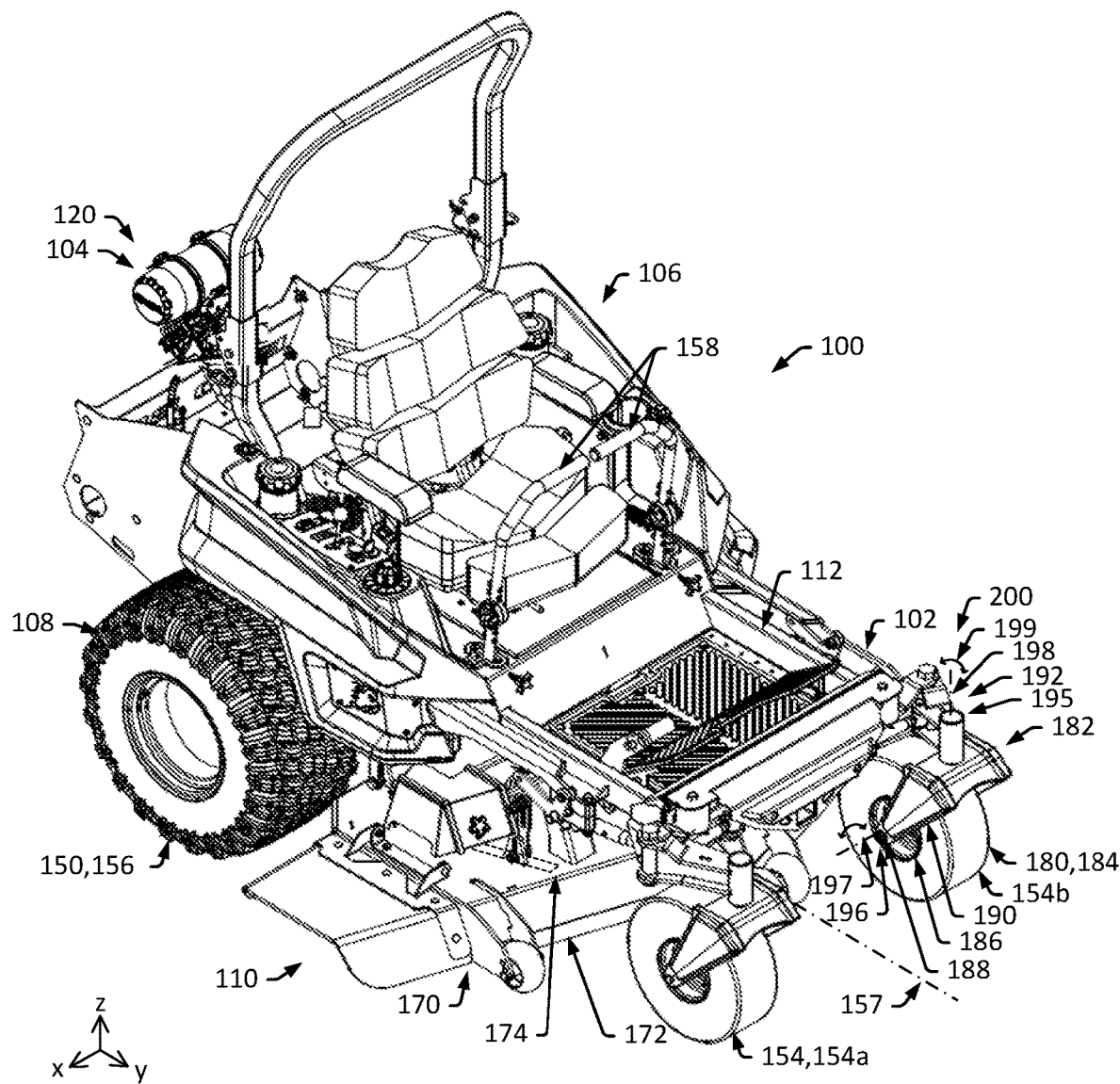

FIGS. 1A and 1B are diagrams that illustrate a sit-on ZTR riding mower (or "mower") 100 in accordance with one or more embodiments. In some embodiments, the mower 100 includes a frame system (or "frame") 102, a power system 104, a control system 106, a drive system 108, a cutting system 110, and a front wheel positioning system (or "positioning system") 200. FIG. 1A illustrates the front wheel positioning system 200 arranged to provide a relatively wide positioning (or "wide stance") of the front wheels 154. FIG. 1B illustrates the front wheel positioning system 200 arranged to provide a relatively narrow positioning (or "narrow stance") of the front wheels 154.

Referring to FIGS. 1A and 1B, in some embodiments, the frame system 102 is a rigid structure that supports components of the mower 100. For example, the frame system (or "frame") 102 may include a rigid structure formed of metal members that are rigidly fastened to one another such that they do not move relative to one another. In some embodiments, the frame 102 includes a frame weldment 112. The frame weldment 112 may include a rigid metal structure formed of multiple members that are welded, or similarly fastened, together. Other components of the mower 100 may be coupled to the frame 102 to position them relative to the frame 102 and other components of the mower 100.

In some embodiments, the power system 104 includes a motor 120. The motor 120 may supply motive power used to operate the mower 100. In some embodiments, the motor 120 includes an engine, such as an internal combustion engine (e.g., a gas-fueled engine, a diesel-fueled engine, or a natural gas-fueled engine) or an electric motor. In some embodiments, the motor 120 is coupled to the frame 102. For example, the motor 120 may be bolted, or otherwise secured, to the frame weldment 112. In some embodiments, the power supplied by the motor 120 rotates (or "drives") a drive shaft of the motor 120, which can, in turn, be used as motive power for other components of the mower 100. For example, rotation of the drive shaft may drive circulation of drive belts that transmit motive power from the drive shaft to the drive system 108 and the cutting system 110.

In some embodiments, one or more drive pulleys are coupled to the drive shaft of the motor 120. The drive pulleys may include, for example, a pump drive pulley and a deck drive pulley. In some embodiments, the drive pulleys engage with respective drive belts that are employed to transmit motive power to other components of the mower 100. For example, the pump drive pulley may engage with a pump drive belt (or "pump belt") that is circulated to transmit motive power to hydraulic pumps of the drive system 108. The deck drive pulley may engage with a deck drive belt (or "deck belt") that is circulated to transmit motive power to spindles and cutting blades of the cutting system 110. During operation of the mower 100, the motor 120 may be operated to rotate the drive shaft, the pump drive pulley and the deck drive pulley, which, in turn, drives circulation of the pump drive belt and the deck drive belt.

In some embodiments, the control system 106 includes controls for regulating operation of the mower 100. For example, the control system 106 may include an ignition switch (e.g., a switch operable to start or stop operation of the motor 120), a throttle control (e.g., a lever operable to regulate the operational speed of the motor 120), a blade control (e.g., a knob operable to engage or disengage the cutting system 110), a wheel brake control (e.g., a lever operable to engage or disengage a wheel brake), a deck height control (e.g., a lever to adjust a height of a cutting deck and blades), or a user interface (e.g., a display of status information for the mower 100, such as motor hours). An operator may interact with the control system 106 to, for example, control and monitor various aspects of the operation of the mower 100.

For reference, the right and left sides of the mower 100 may be defined relative to the direction an operator is expected to be primarily facing while operating the mower 100. "Forward" may refer to the direction that an operator is expected to be primarily facing while operating the mower 100. In accordance with the coordinate system axes illustrated, "right" may refer to the positive "x" direction, "left" may refer to the negative "x" direction, "front" (or "forward") may refer to the positive "y" direction, "back" (or "rearward" or "backward") may refer to the negative "y" direction, "up" (or "upward") may refer to the positive "z" direction, and "down" (or "downward") may refer to the negative "z" direction. A longitudinal axis 157 of the mower 100 may be oriented in the "y" direction, for example, passing through or near a midpoint between the rear wheels 156 of the mower 100 and extending forward and backward. Unless otherwise specified, "lateral" (or "sideways") movement of components may refer to the components moving left or right (e.g., moving in a direction parallel to the x-axis), "longitudinal" movement of components may refer to the components moving forward or backwards (e.g., moving in a direction parallel to the y-axis), and "vertical" movement of components may refer to the components moving upwards or downwards (e.g., moving in a direction parallel to the z-axis).

In some embodiments, the drive system (or "propulsion system") 108 includes components for driving (or "propelling") the mower 100. In some embodiments, the drive system 108 includes wheel assemblies (or "wheels") 150 and one or more drive units that supply motive power to propel the mower 100. For example, the drive system 108 may include right and left forward wheel assemblies (or "front wheel assemblies" or "front wheels") 154, right and left rear wheel assemblies (or "back wheel assemblies" or "back wheels") 156, and right and left drive units operable to drive rotation of the right and left rear wheels 156, respectively, to propel the mower 100 across the ground. Each of the wheel assemblies 150 may include, for example, a tire assembly that includes a tire coupled a rim (or "wheel").

The front wheels 154 may be positioned at or near a front end of the frame system 102. For example, the front wheels 154 may include a right front wheel 154a positioned at a right-front of the mower 100 (e.g., to provide support for a right-front portion of the mower 100) and a left front wheel 154b positioned at a left-front of the mower 100 (e.g., to provide support for a left-front portion of the mower 100). The front wheels 154 may not receive motive power intended to propel the mower 100 and, thus, may be referred to as "non-driven" wheels. In some embodiments, each of the front wheels 154 is a caster style wheel that can swivel about a vertically oriented rotational axis (e.g., a rotational axis oriented in the y-direction) in response to corresponding movements of the mower 100. For example, each of the front wheels 154 may include a tire assembly 180 rotatably coupled to a front caster wheel fork member ("front fork") 182 that is rotatably coupled to a front portion of the frame 102 of the mower 100. The tire assembly 180 may include a tire 184 (e.g., a rubber tire) mounted to a rim 186 (e.g., a circular metal wheel). The tire assembly may be rotatably coupled to the front fork 182 by way of a wheel axle 188 (e.g., a horizontally oriented bolt) that passes through the rim 186 and is secured to a body 190 of the fork 182 (e.g., by way of a nut or similar fastener). The front fork 182 may be rotatably coupled to the frame 102, for example, by way of a caster stem 192 that is coupled to a caster receiver 195 located on forward portion of the frame 102. The caster stem 192 may include, for example, a cylindrical member that extends upward from the body 190 of the fork 182. The caster receiver 195 may include, for example, a vertically oriented hollow cylindrical tube having bearings disposed therein. In such an embodiment, the cylindrical member of the caster stem 192 may be disposed through the bearings and the tube of the caster receiver 195, and be secured to the caster receiver 195 by way of a nut (or similar fastener) attached to an upper threaded portion of the cylindrical member of the caster stem 192. During operation, the tire assembly 180 may be free to rotate (or "roll") about a horizontally oriented axle axis 196 (e.g., a rotational axis defined by a longitudinal axis of the wheel axle 188) (as illustrated by arrow 197), and the front fork 182 and the tire assembly 180 may be free to rotate (or "swivel") together about a vertically oriented caster axis 198 (e.g., defined by a longitudinal axis of the caster stem 192) (as illustrated by arrow 199). The freedom of movement may enable the tire assembly 180 to roll and swivel in response to corresponding movements of the front portion of the mower 100.

The rear wheels 156 may be positioned at or near a rear end of the frame system 102. For example, the rear wheels 156 may include a right rear wheel positioned at a right-rear of the mower 100 (e.g., to provide support for a right-rear portion of the mower 100) and a left rear wheel (not visible) positioned at a left-rear of the mower 100 (e.g., to provide support for a left-rear portion of the mower 100). The rear wheels 156 may be driven into rotation by motive power intended to propel the mower 100 and, thus, may be referred to as "driven" or "drive" wheels. In some embodiments, drive units drive rotation of the rear wheels 156 to propel the mower 100. Each of the right and left rear wheels 156 may be coupled to a drive axle of right and left drive units, respectively. Each of the drive units may include, for example, a hydrostatic (or "hydraulic") transaxle that is selectively operable to rotate its drive axle (and its associated wheel 156) forward or backward about a horizontally oriented rotational axis (e.g., a rotational axis oriented in the x-direction). An operator may, for example, push/pull right or left control levers 158 (coupled to the drive units) to selectively operate the respective drive units to drive rotation of the rear wheels 156 forward or backward.

In some embodiments, the cutting system 110 includes components that provide for cutting (or "mowing") of grass. The cutting system 110 may include, for example, a mowing deck system (or "deck system") 170 that includes a mowing deck (or "deck") 172 that houses one or more cutting blades (or "blades") 174. During operation of the mower 100, the blades 174 may be driven into rotation to cut (or "mow") grass under the deck 172 as the mower 100 traverses the ground. The deck 172 may include, for example, a rigid housing (e.g., a metal housing) that shields the operator and components of the mower 100 from debris, such as flying grass, dust or rocks generated by the rotating blades 174. In some embodiments, the cutting system 110 includes multiple blades 174. For example, the deck system 170 may include left, center and right blades 174.

In some embodiments, the front wheel positioning system 200 includes a forward portion of the frame 102 that provides for adjustment of the positioning of the front wheels 154 relative to other portions of the mower 100, such as other portions of the frame 102 or the cutting system 110. The positioning system 200 may enable the front wheels 154 to be moved into a position that promotes an even cut. For example, the positioning system 200 may enable one or both of the front wheels 154a and 154b to be moved right or left such that they align with high suction zones of the cutting system 110. This flexibility may enable the mower 100 to provide an even cut in a variety of configurations and conditions.

Figure 2A:
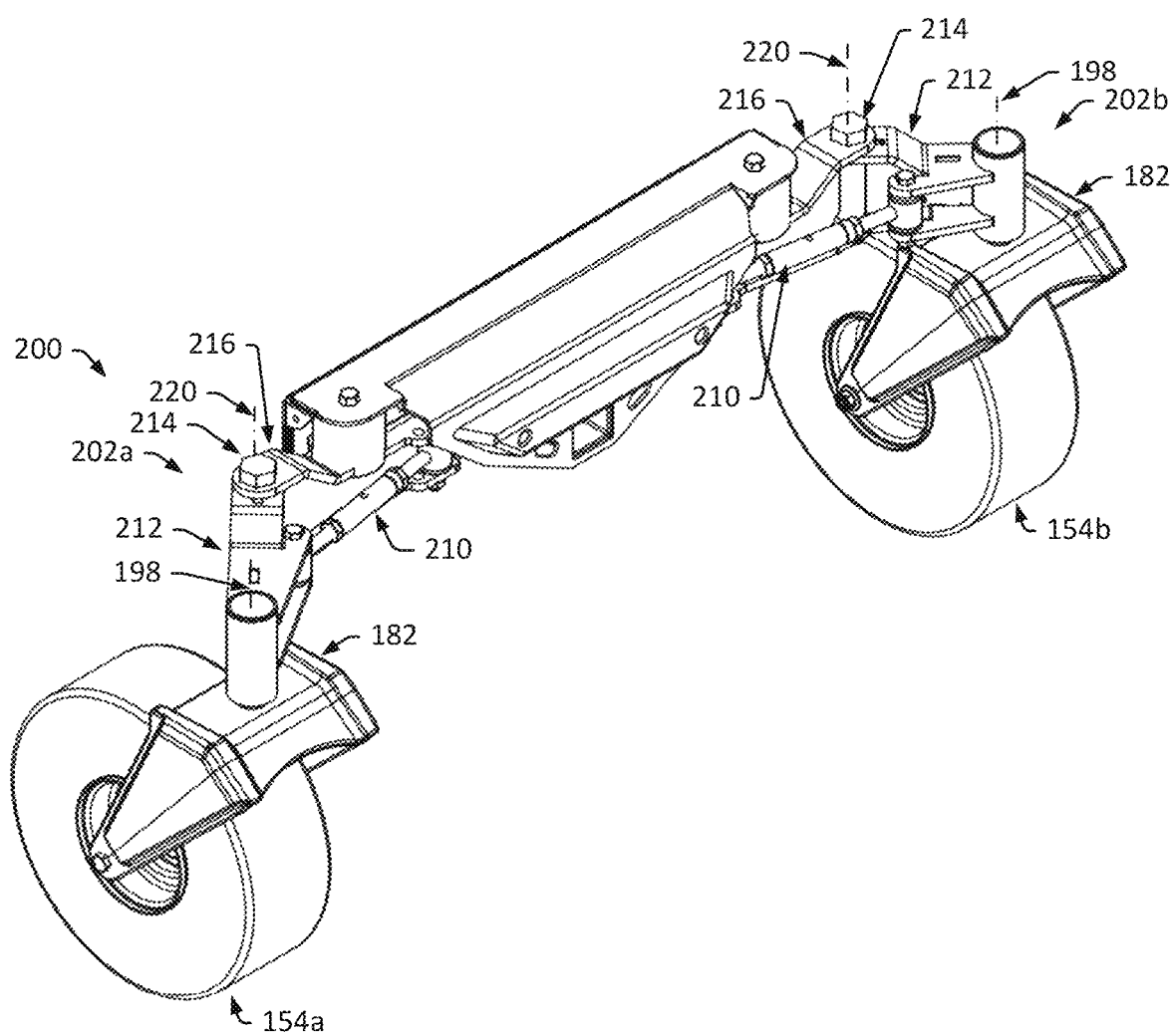
FIGS. 2A and 2B are perspective views of a front wheel positioning system in accordance with one or more embodiments.
Figure 2B:
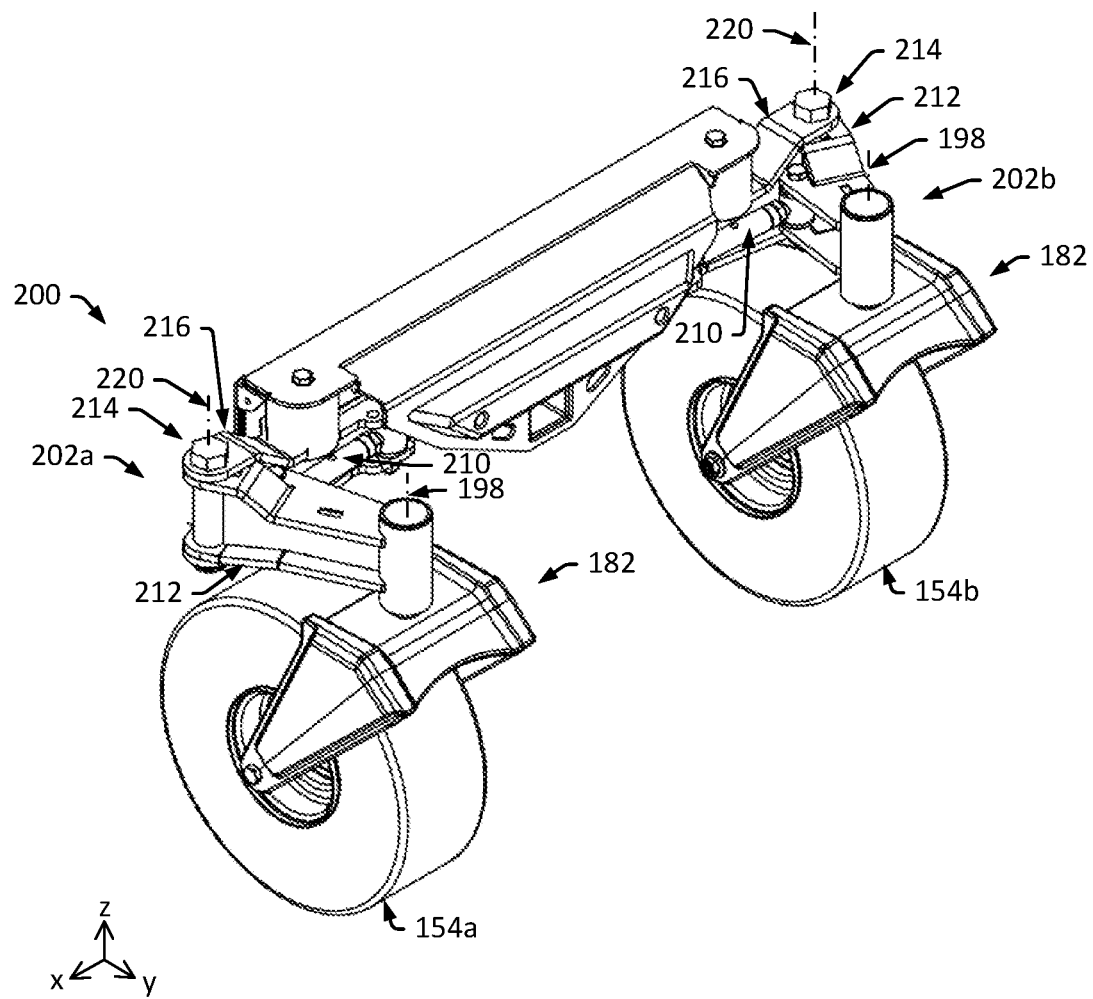

FIGS. 2A and 2B illustrate a front wheel positioning system in accordance with one or more embodiments. FIG. 2A illustrates the front wheel positioning system 200 arranged to provide a relatively wide positioning (or "wide stance") of the front wheels 154. FIG. 2B illustrates the front wheel positioning system 200 arranged to provide a relatively narrow positioning (or "narrow stance") of the front wheels 154. In the illustrated embodiment, the front wheel positioning system 200 includes a right front wheel positioning system 202a and a left front wheel positioning system 202b. The right and left front wheel positioning systems 202a and 202b may provide for adjustment of the positions of the right and left front wheels 154a and 154b, respectively. In some embodiments, each of the right and left the front wheel positioning systems 202a and 202b includes a front wheel positioning member (or "positioning arm") 210, a movable front wheel support member (or "support arm") 212, a front wheel support member pivot (or "support arm wheel pivot") 214 that defines a support arm wheel pivot axis 220, and a front wheel support member (or "support member") 216. The positioning arm 210 of each the right and left the front wheel positioning systems 202a and 202b may have an adjustable length such that it can be extended or retracted (e.g., lengthened or shortened) to adjust a position of the associated right or left front wheel 154a or 154b relative to the frame 102 or other components of the mower 100. Although the right front wheel positioning system 202a is shown and described in some instances for the purpose of illustration (e.g., in FIGS. 4A-4E), the left front wheel positioning system 202b may be similar to the right front wheel positioning system 202a. For example, the left front wheel positioning system 202b may be a mirror image of the right front wheel positioning system 202a (e.g., having similar components oriented as if they were mirrored across the y-z plane). Accordingly, descriptions of the right front wheel positioning system 202a may generally apply to the left front wheel positioning system 202b.

Figure 3A:
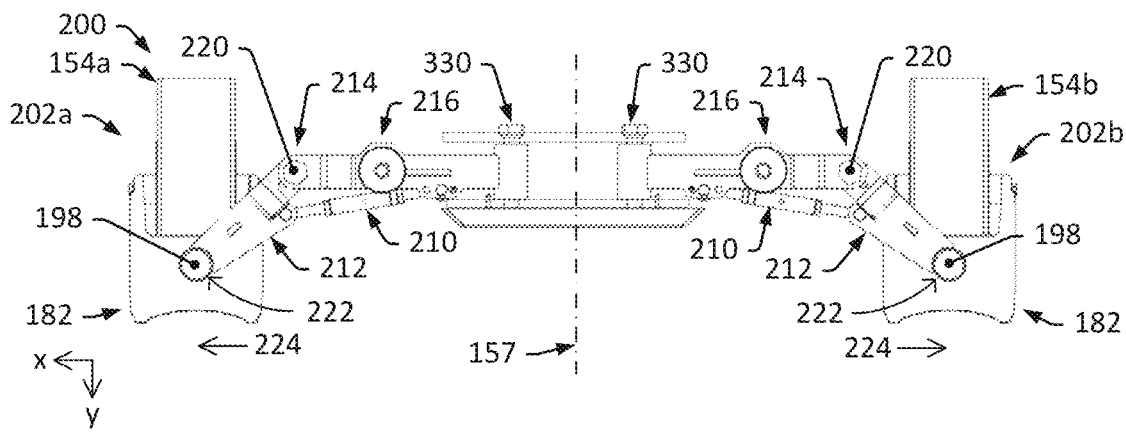
FIGS. 3A and 3B are top views of a front wheel positioning in accordance with one or more embodiments.
Figure 3B:
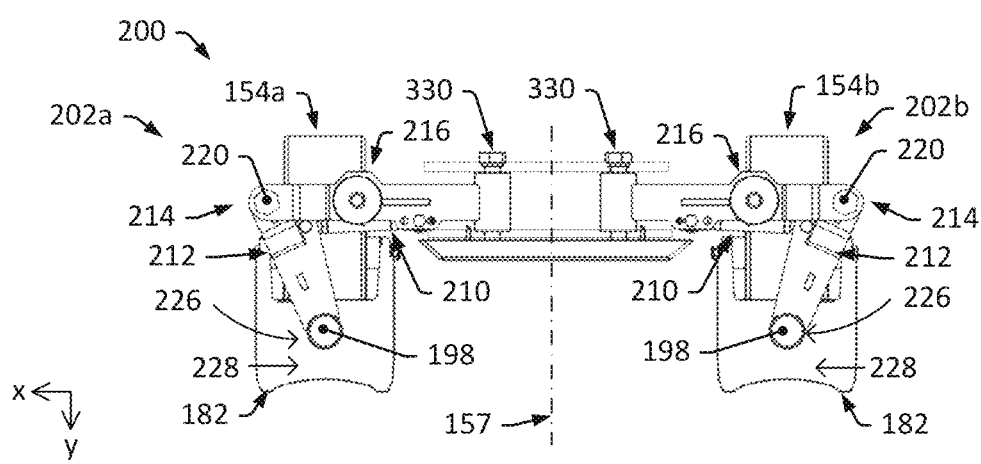

FIGS. 3A and 3B are top views of the front wheel positioning system 200 of FIGS. 2A and 2B in accordance with one or more embodiments. FIG. 3A illustrates the front wheel positioning system 200 arranged to provide a relatively wide positioning (or "wide stance") of the front wheels 154. FIG. 3B illustrates the front wheel positioning system 200 arranged to provide a relatively narrow positioning (or "narrow stance") of the front wheels 154. Positioning the front wheels 154 in the relatively wide positioning of FIG. 3A (or FIG. 1A or 2A) may involve, for example, extending (or "lengthening") the positioning arms 210 of the right and left front wheel positioning systems 202a and 202b to rotate the support arms 212 and the right and left front wheels 154a and 154b in an arced path about the support arm wheel pivot 214 (and the support arm wheel pivot axis 220) (as illustrated by arrow 222). This may provide corresponding outward lateral movement of the right and left front wheels 154a and 154b (e.g., movement of the right and left front wheels 154a and 154b away from the longitudinal axis 157 of the mower 100) (as illustrated by arrow 224). Positioning the front wheels 154 in the relatively narrow positioning of FIG. 3B (or FIG. 1B or 2B) may involve, for example, retracting (or "shortening") the positioning arms 210 of the right and left front wheel positioning systems 202a and 202b to rotate the support arms 212 (and the right and left front wheel 154a and 154b) inward (e.g., toward the longitudinal axis 157 of the mower 100), in an arced path about the support arm wheel pivot 214 (and the support arm wheel pivot axis 220) (as illustrated by arrow 226). This may provide corresponding inward lateral movement of the right and left front wheels 154a and 154b (e.g., movement of the right and left front wheels 154a and 154b toward the longitudinal axis 157 of the mower 100) (as illustrated by arrow 228).

Although embodiments are described that involve the right and left front wheels 154a and 154b both being moved outward or inward to provide a relatively wide or narrow positioning of the front wheels 154 for the purpose of illustration, embodiments may provide for adjustment of the positioning of the right or left front wheels 154a and 154b independent of one another. For example, the positioning arm 210 of one of the wheel positioning systems 202a and 202b may be lengthened or shortened to move the associated front wheel 154a or 154b outward or inward, with or without a corresponding adjustment to the positioning arm 210 of the other wheel positioning system 202b or 202a. This may enable fine-tuning of the position of each of the right and left front wheels 154a and 154b relative to other components of the mower 100. For example, if the cut following the path of the right front wheel 154a is uneven, and the cut following the path of the left front wheel 154b is relatively even, an operator may iteratively extend or retract the positioning arm 210 of the right front wheel positioning systems 202a until the mower 100 is providing an even cut in the path of the right front wheel 154a. This may result, for example, from the operator's adjustment that moves the front right wheel 154a into a lateral positon that aligns with a high suction area of the cutting system 110. As a further example, during manufacture of the mower 100 with a given deck, frame and blade combination, the manufacture may adjust the length of one or both of the positioning arms 210 of the wheel positioning systems 202b and 202a to position the right and left front wheels 154a and 154b in an optimal position for the deck, frame and blade combination. This may include, for example, the manufacturer adjusting the length of one or both of the positioning arms 210 of the wheel positioning system 202b and 202a to move the front right and left front wheels 154a and 154b into lateral positons that each align with a high suction area of the cutting system 110.

FIGS. 4A-4E are diagrams that illustrate the right front wheel positioning system 202a in accordance with one or more embodiments. As noted previously, the front wheel positioning system 202a may include a front wheel positioning member (or "positioning arm") 210, a movable front wheel support member (or "support arm") 212, a front wheel support member pivot (or "support arm wheel pivot") 214, and a front wheel support member (or "support member") 216. The positioning arm 210 may be extended or retracted (e.g., lengthened or shortened) to adjust a position of the right front wheel 154a. For example, referring to FIG. 4B, the positioning arm 210 may be extended (or "lengthened") to move the right front wheel 154a to the right (e.g., in the positive "x" direction, away from the longitudinal axis 157 of the mower 100) (as illustrated by arrow 300), or the positioning arm 210 may be retracted (or "shortened") to move the right front wheel 154a to the left (e.g., in the negative "x" direction, toward the longitudinal axis 157 of the mower 100) (as illustrated by arrow 302). The resulting movement may include pivoting of the support arm 212 (and the right front wheel 154a) about the support arm wheel pivot 214. For example, extension (or "lengthening") of the positioning arm 210 may cause the support arm 212 (and the right front wheel 154a) to rotate in an arced path about the support arm wheel pivot axis 220 defined by the support arm wheel pivot 214 (as illustrated by arrow 304). Retraction (or "shortening") of the positioning arm 210 may cause the support arm 212 (and the right front wheel 154a) to rotate in an arced path about the support arm wheel pivot axis 220 (as illustrated by arrow 306). Movement along such an arced path may result in changes of one or both of lateral and longitudinal positioning of the right front wheel 154a depending on the extent of the movement. For example, referring to FIG. 4B, the outward arced movement (illustrated by arrow 304) may include "outward" lateral translation (e.g., in the positive "x" direction, away from the longitudinal axis 157 of the mower 100) (illustrated by arrow 300) and "backward" longitudinal translation (e.g., in the negative "y" direction) (as illustrated by arrow 308). The inward arced movement (illustrated by arrow 306) may include inward lateral translation (e.g., in the negative "x" direction, toward the longitudinal axis 157 of the mower 100) (illustrated by arrow 302) and "forward" longitudinal translation (e.g., in the positive "y" direction) (illustrated by arrow 310).

In some embodiments, the front wheel support member ("support member") 216 is a member that extends laterally from the frame 102. The support member 216 may be, for example, a metal beam having a first end (or "proximal end") 320 coupled to the frame weldment 112 and a second end (or "distal end") 322 including the support arm wheel pivot 214. In some embodiments, the first end 320 is fixedly coupled to a portion of the frame 102. For example, the proximal end 320 may be welded, bolted to or otherwise rigidly fastened to members of the frame weldment 112.

In some embodiments, the proximal end 320 is pivotally coupled to the frame weldment 112. For example, the first end 320 of the support member 216 may include a support arm frame pivot 324 that provides for pivotal coupling of the proximal end 320 of the support member 216 to the frame weldment 112. In such an embodiment, the support arm frame pivot 324 may define a support arm frame pivot axis 326 about which the support member 216 can pivot. For example, the support arm frame pivot 324 may include a horizontally oriented support arm frame pivot receiver 328 (e.g., a horizontally oriented cylindrical tube), and the support member 216 may be pivotally coupled to the frame weldment 112 by way of a frame pivot member 330 (see, FIGS. 3A and 3B) that passes through a cylindrical bushing disposed in the support arm frame pivot receiver 328 and is secured to adjacent mounting points of the frame weldment 112. The frame pivot member 330 may be, for example, a bolt that passes through a cylindrical bushing disposed in the support arm frame pivot receiver 328 and is secured to bolt holes in the frame weldment 112. The support arm frame pivot receiver 328 and the frame pivot member 330 may define the support arm frame pivot axis 326. The support arm frame pivot receiver 328, the frame pivot member 330, and the associated support arm frame pivot axis 326 may be horizontally oriented such that it enables "vertical" pivoting of the support member 216. Such vertical pivoting may enable vertical movement (e.g., upward and downward movement, in the positive and negative "z" directions) of the distal end 322 of the support member 216 and elements coupled thereto (including the support arm 212 and the front wheel 154) relative to the frame weldment 112. In some embodiments, the vertical pivoting and corresponding movement may be regulated by a resilient member that is disposed between the support member 216 and a complementary portion of the frame 102. For example, an elastomeric resilient member 331 may be disposed between an upward facing surface of the support member 216 and a complementary downward facing surface of the frame 102 to bias the support member 216 to a given "vertical" position (see, e.g., FIG. 4D). The regulated vertical movement may enable the front wheel 154 to follow contours of the ground traversed by the mower 100.

In some embodiments, the support arm wheel pivot 214 defines the support arm wheel pivot axis 220 about which the support arm 212 pivots. For example, the support arm wheel pivot 214 may include a vertically oriented support arm wheel pivot hinge (or "hinge") 332, and the support arm 212 may be pivotally coupled to the support member 216 by way of the hinge 332. The hinge 332 may be defined, for example, by a support arm pivot member 334 that spans complementary mounting holes 336 (e.g., spans top and bottom mounting holes 336a and 336b) in the distal end 322 of the support member 216 and that passes through a support arm frame pivot receiver 338 in a first end (or "proximal end") 339 of the support arm 212 (See, e.g., FIG. 4D). The support arm pivot member 334 may include, for example, a bolt that is secured in the mounting holes 336 by way of a nut. The longitudinal axes of the support arm pivot member 334 and the support arm frame pivot receiver 338 may be coaxial and define the support arm wheel pivot axis 220. The support arm pivot member 334, the support arm frame pivot receiver 338, and the associated support arm wheel pivot axis 220 may be vertically oriented such that it enables horizontal pivoting of the support arm 216 relative to the support member 216. Such horizontal pivoting may provide for lateral movement (e.g., right and left movement, in the positive and negative x directions) of a distal end 337 of the support arm 212 (including the caster receiver 195) and elements coupled thereto (e.g., including the right front wheel 154a) relative to the support arm 216 and the frame weldment 112. In some embodiments, the horizontal pivoting of (and corresponding rotational movement of) the distal end 337 of the support arm 212 provides for adjustment of the lateral position of the right front wheel 154a.

In some embodiments, the positioning arm 210 is an elongated member having an adjustable length. As discussed previously, the ability to adjust the length of the positioning arm 210 may enable adjustments to the lateral positioning of the front wheel 154. For example, the positioning arm 210 may be extended (or "lengthened") to rotate the distal end 337 of the support arm 212 (and the front wheel 154) outward about the pivot axis 214 (as illustrate by arrow 304), which provides outward lateral movement of the distal end 337 of the support arm 212 (and the front wheel 154a) (as illustrated by arrow 300). The positioning arm 210 may be retracted (or "shortened") to rotate the distal end 337 of the support arm 212 (and the front wheel 154a) inward about the pivot axis 214 (as illustrated by arrow 306), which provides inward lateral movement of the distal end 337 of the support arm 212 (and the front wheel 154a) (as illustrated by arrow 302).

In some embodiments, the positioning arm 210 is an adjustable linkage. For example, the positioning arm 210 may include a first link end 340 and a second link end 342 coupled to one another by way of a link body 344. The first link end 340 may include a distal end 350 defined by a bushing joint 352 and a proximal end 354 defined by a male threaded stud 356. The bushing joint 352 may couple to a complementary positioning arm mount 360 located on a forward facing side of the support member 216. The bushing joint 352 may be defined, for example, by a vertically oriented cylindrical tube 362 housing a cylindrical bushing 364 through which a first positioning arm mount member 366 is disposed. The first positioning arm mount member 366 may be, for example, a bolt that passes through the bushing 364 of the bushing joint 352 and spans complementary bolt holes 368 of the positioning arm mount 360 (see, e.g., FIG. 4D). The bushing joint 352 and the positioning arm mount 360 may have coaxial longitudinal axes that define a vertically oriented first positioning arm pivot axis 369 about which the positioning arm 210 pivots relative to the support member 216 (see, e.g., FIGS. 4B and 4D).

The second link end 342 may include a distal end 380 defined by a bushing joint 382 and a proximal end 384 defined by a male threaded stud 386. The bushing joint 382 may couple to a complementary positioning arm mount 390 located on a forward facing side of the support arm 212. The bushing joint 382 may be defined, for example, by a vertically oriented cylindrical tube 392 housing a cylindrical bushing 394 through which a second positioning arm mount member 396 is disposed. The second positioning arm mount member 396 may be, for example, a bolt that passes through the bushing of the bushing joint 384 and spans complementary bolt holes 398 of the positioning arm mount 390 (see, e.g., FIG. 4D). The bushing joint 382 and the positioning arm mount member 390 may have coaxial longitudinal axes that define a vertically oriented second positioning arm pivot axis 399 about which the positioning arm 210 pivots relative to the support arm 212 (see, e.g., FIGS. 4B and 4D).

The link body 344 may be a cylindrical tube having a first end 380 and a second end 382. The first end 380 may have female threading that is complementary to the male threading of the threaded stud 356 of the first link end 340. The second end 382 may have a female threading that is complementary to the threading of the male threading of the threaded stud 386 of the second link end 342. The female threading of the first end 380 (and the male threading of the threaded stud 356) may be of an opposite direction to the female threading of the second end 382 (and the male threading of the threaded stud 386). For example, the female threading of the first end 380 (and the male threading of the threaded stud 356) may be right hand threading and the female threading of the second end 382 (and the male threading of the threaded stud 386) may be left hand threading. In such an embodiment, the first and second ends 380 and 382 of ends of the link body 344 may be threaded (or "mated") with the complementary threads of the male threaded stud 356 of the first link end 340 and the male threaded stud 386 of the second link end 342, respectively, such that rotation of the link body 344 (e.g., about a longitudinal axis 400 of the positioning arm 210) in a first direction (e.g., clockwise) causes extension (or "lengthening") of the positioning arm 210, and rotation of the link body 344 in a second direction (e.g., counterclockwise) causes retraction (or "shortening") of the positioning arm 210. In some embodiments, a jam nut 402 is threaded onto the male threaded stud 386. The jam nut 402 may be tightened against the link body 344 to inhibit rotation of the link body 344. This may set (or "fix") the length of the positioning arm 210 (and, in turn, the lateral position of the front wheel 154a).

In some embodiments, the support member 216 has a length ($D_1$) in the range of about 8 to 18 inches (inches) (e.g., $D_1$ may be about 14.375 inches). The length of the support member 216 may be defined by a distance between the pivot axis 220 and the support arm frame pivot axis 326 (see, e.g., FIG. 4B).

In some embodiments, the support arm 212 has a length ($D_2$) in the range of about 3 to 10 inches (e.g., $D_2$ may be about 6.5 inches). The length of the support arm 212 may be defined by a distance between the pivot axis 220 and the wheel caster axis 198 (see, e.g., FIG. 4B).

In some embodiments, the positioning arm 210 can be adjusted to a length (L) in the range of about 8 to 12 inches. For example, the positioning arm 210 may be adjustable between a maximum (or "fully extended") length ($L_{max}$) of about 12 inches and a minimum (or "fully retracted") length ($L_{min}$) of about 8 inches. The length (L) of the positioning arm 210 may be defined by a distance between the first positioning arm pivot axis 369 and the second positioning arm pivot axis 399 (see, e.g., FIG. 4B).

Figure 4A:
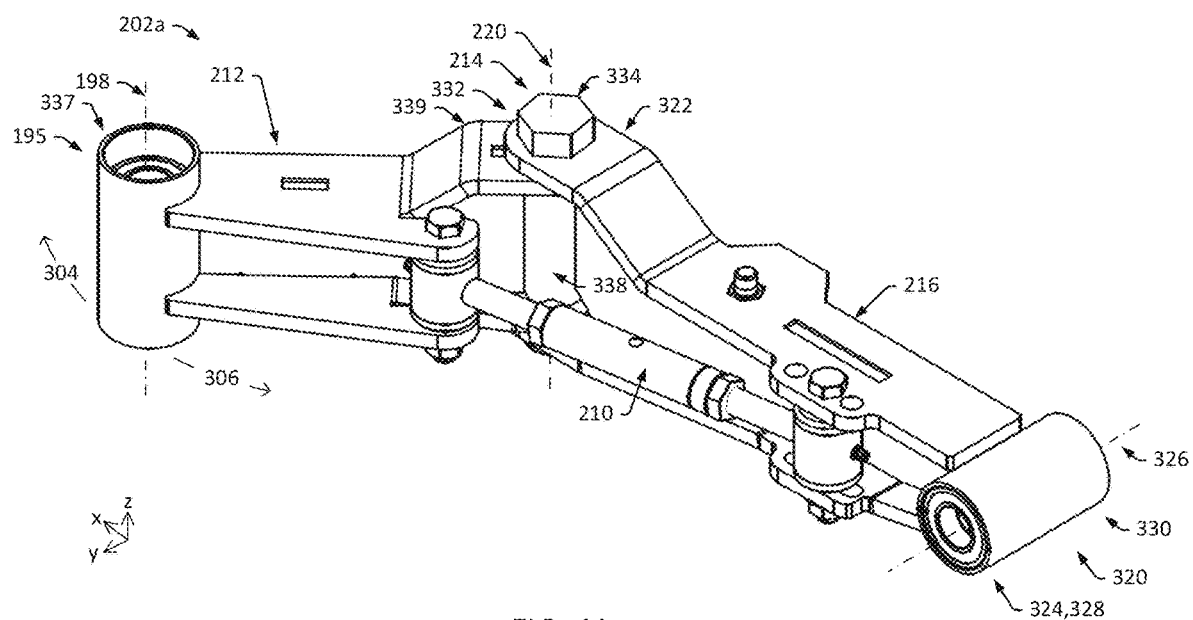
FIGS. 4A-4E are diagrams that illustrate a right front wheel positioning system in accordance with one or more embodiments.
Figure 4B:
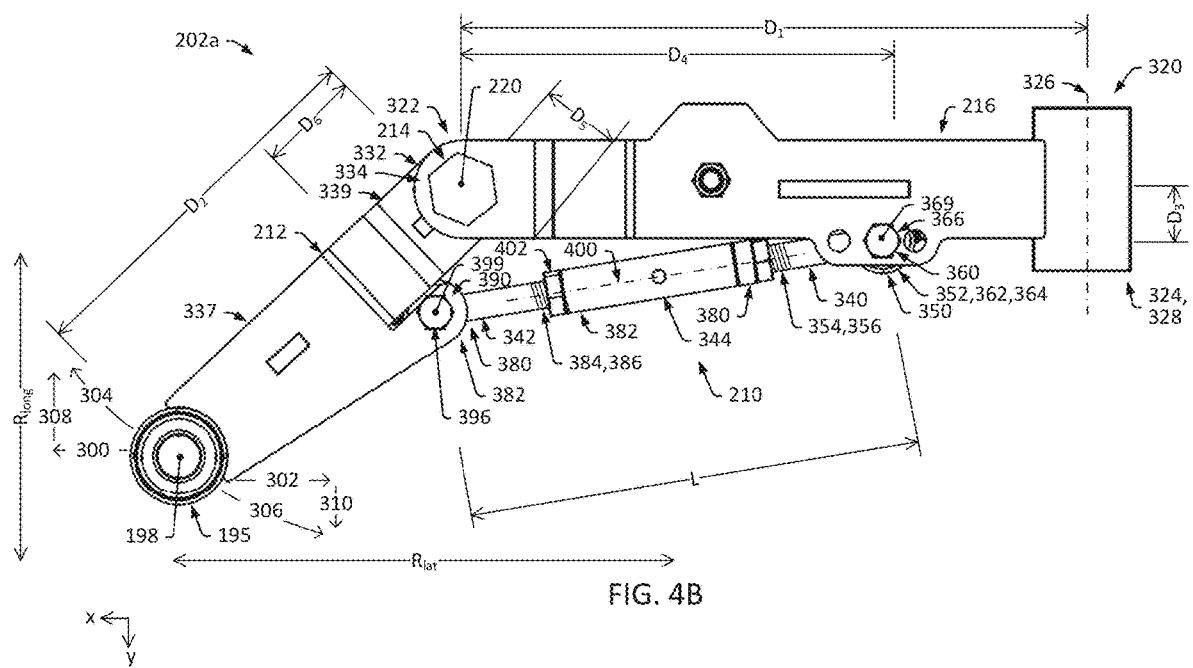
Figure 4C:
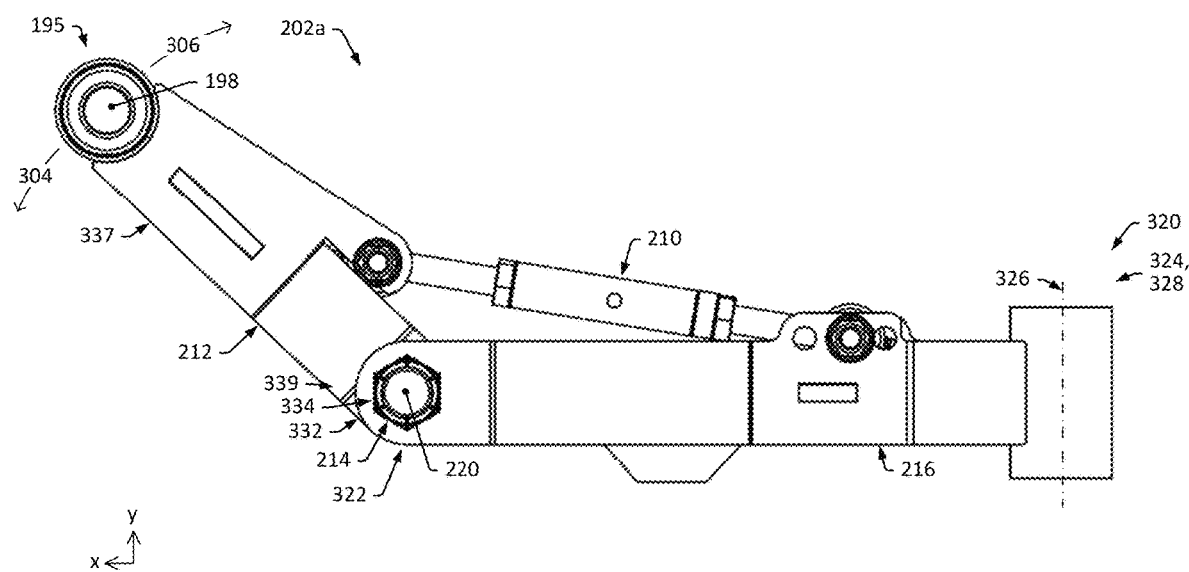
Figure 4D:
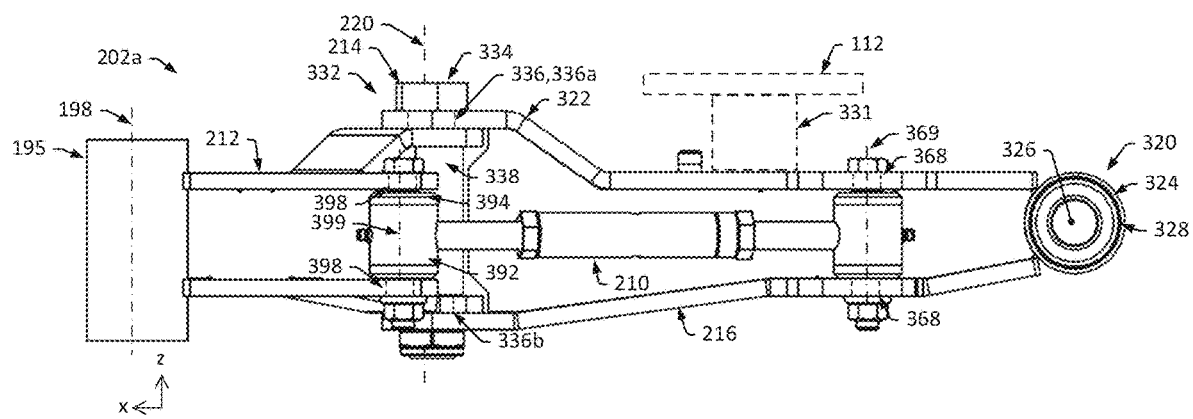
Figure 4E:
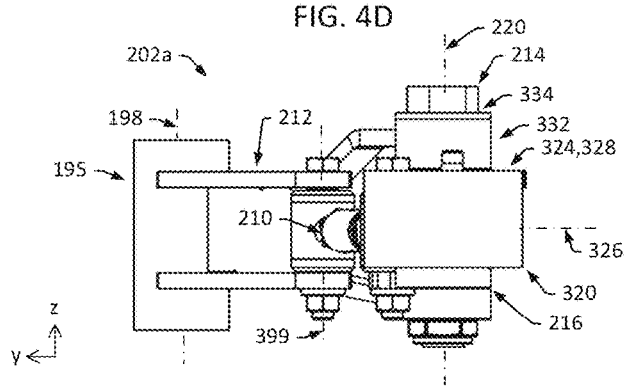

In some embodiments, the first positioning arm pivot axis 369 is longitudinally offset from the pivot axis 220 by a distance ($D_3$) in the range of about 0.25 to 3 inches (e.g., $D_3$ may be about 1.25 inches) (see, e.g., FIG. 4B).

In some embodiments, the first positioning arm pivot axis 369 is laterally offset from the pivot axis 220 by a distance ($D_4$) in the range of about 7 to 11 inches (e.g., $D_4$ may be about 9.75 inches) (see, e.g., FIG. 4B).

In some embodiments, the second positioning arm pivot axis 399 is longitudinally offset from the pivot axis 220 by a distance ($D_5$) in the range of about 0.75 to 2.5 inches (e.g., $D_5$ may be about 1.5 inches) (see, e.g., FIG. 4B).

In some embodiments, the second positioning arm pivot axis 399 is laterally offset from the pivot axis 220 by a distance ($D_6$) in the range of about 1.5 to 4 inches (e.g., $D_6$ may be about 2.9 inches) (see, e.g., FIG. 4B).

In some embodiments, the front wheel has a lateral range of adjustment ($R_{lat}$) of about 8 inches. The lateral range of adjustment ($R_{lat}$) may be defined by the difference in the lateral position (e.g., the difference in the "x" position) of the wheel caster axis 198 with the positioning arm 210 fully extended and the positioning arm 210 fully retracted (see, e.g., FIG. 4B).

In some embodiments, the front wheel has a longitudinal range of adjustment ($R_{long}$) of about 6 inches. The longitudinal range of adjustment ($R_{long}$) may be defined by the difference in the maximum and minimum longitudinal positions (e.g., the difference in the maximum and minimum "y" positions) of the wheel caster axis 198 across the range of wheel positions provided between the positioning arm 210 being fully extended and the positioning arm 210 being fully retracted (see, e.g., FIG. 4B).

Figure 5A:
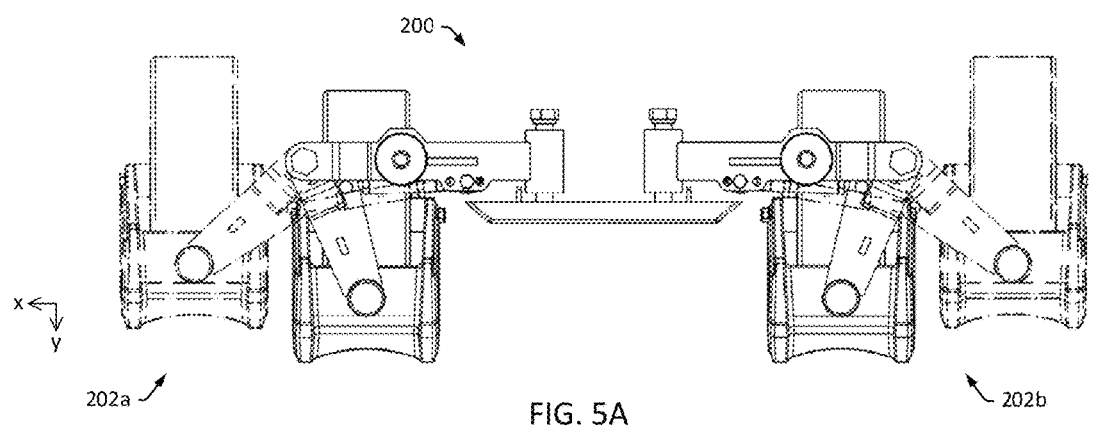
FIGS. 5A-5C are diagrams that illustrate operation of the wheel positioning system in accordance with one or more embodiments.
Figure 5B:
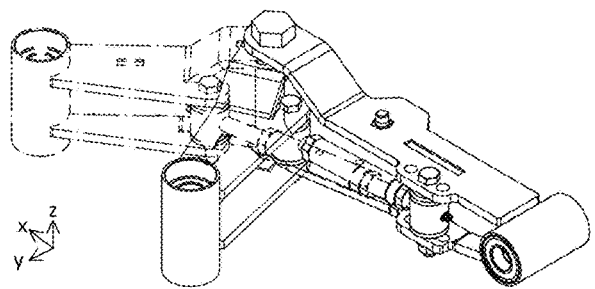
Figure 5C:
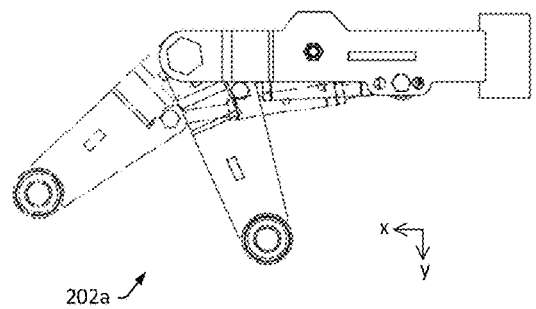

FIGS. 5A-5C illustrate operation of the wheel positioning system 200 in accordance with one or more embodiments. FIG. 5A illustrates a top view of the front wheel positioning system 200 demonstrating movement between a relatively wide positioning (or "wide stance") of the front wheels 154 (in broken lines and similar to that of FIG. 3A) and a relatively narrow positioning (or "narrow stance") of the front wheels 154 (in solid lines and similar to that of FIG. 3B). FIGS. 5B and 5C illustrate perspective and top views, respectively, of the right front wheel positioning system 202a of the front wheel positioning system 200 that demonstrate movement between an outward (relatively wide) positioning of the system 202a (in broken lines and similar to that of FIG. 4A), and an inward (relatively narrow) positioning of the system 202a (in solid lines).

Figure 6:
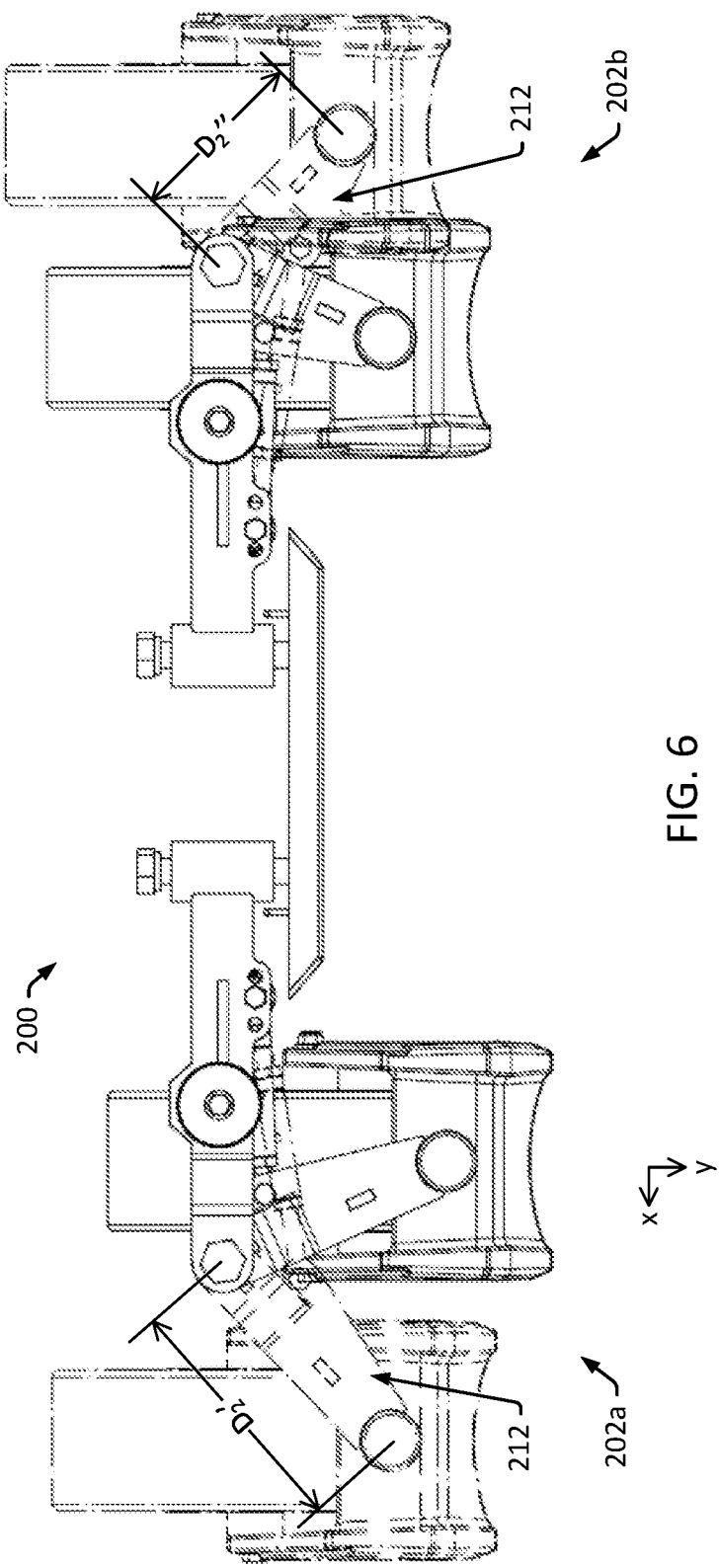
FIG. 6 is a diagram that illustrates a front wheel positioning system employing different length front wheel support members in accordance with one or more embodiments While this disclosure is susceptible to various modifications and alternative forms, specific embodiments are shown by way of example in the drawings and will be described in detail. The drawings may not be to scale. It should be understood that the drawings and the detailed descriptions are not intended to limit the disclosure to the particular form disclosed, but are intended to disclose modifications, equivalents, and alternatives falling within the spirit and scope of the present disclosure as defined by the claims.

In some embodiments, the right and left support arms 212 may be of different lengths. For example, as illustrated in FIG. 6, the right support arm 212 may have a first length ($D_2'$) and the left support arm 212 may have a second length ($D_2''$). For example, the first length ($D_2'$) may be about 14 inches, and the second length ($D_2''$) may be about 6 inches. The lengths may be varied to, for example, provide appropriate wheel positioning and movement.

What is claimed is:

1. A zero-turn radius (ZTR) riding mower system, comprising:
    a right front caster wheel;
    a left front caster wheel;
    a right rear drive wheel configured to be selectively driven into rotation by a right drive unit;
    a left rear drive wheel configured to be selectively driven into rotation by a left drive unit; and
    a frame system comprising:
        a frame weldment;
        a front wheel positioning system configured to enable adjustment of lateral positioning of the right front caster wheel and adjustment of a lateral positioning of the left front caster wheel, the front wheel positioning system comprising:
            a right wheel positioning system comprising:
                a right wheel support arm;
                a right wheel support member; and
                a right wheel positioning arm having an adjustable length, the right wheel positioning arm having a proximal end pivotally coupled to the right wheel support member and a distal end pivotally coupled to the right wheel support arm,
            wherein:
                a first end of the right wheel support arm is coupled to the right front caster wheel,
                a second end of the right support arm is pivotally coupled to the right support member by way of a right support arm wheel pivot that defines a vertically oriented right wheel pivot axis,
                the right wheel support arm and the right front caster wheel are configured to rotate together about the wheel pivot axis responsive to adjustment of the length of the right wheel positioning arm,
                the right wheel support member pivotally coupled to the frame weldment by way of a right support member pivot that defines a horizontally oriented right support member pivot axis, and
                the right wheel support member, the right wheel support arm, and the right front caster wheel configured to rotate together about the right support member pivot axis; and
            a left wheel positioning system comprising:
                a left wheel support arm;
                a left wheel support member; and
                a left wheel positioning arm having an adjustable length, the left wheel positioning arm having a proximal end pivotally coupled to the left wheel support member and a distal end pivotally coupled to the left wheel support arm,
            wherein:
                a first end of the left wheel support arm is coupled to the left front caster wheel,
                a second end of the left support arm is pivotally coupled to the left support member by way of a left support arm wheel pivot that defines a vertically oriented left wheel pivot axis, the left wheel support arm and the left front caster wheel are configured to rotate together about the wheel pivot axis responsive to adjustment of the length of the left wheel positioning arm, the left wheel support member pivotally coupled to the frame weldment by way of a left support member pivot that defines a horizontally oriented left support member pivot axis, and the left wheel support member, the left wheel support arm, and the left front caster wheel configured to rotate together about the left support member pivot axis, wherein the left support member pivot axis is distinct from the right support member pivot axis, and wherein the right wheel support member, the right wheel support arm, and the right front caster wheel are configured to rotate together about the right support member pivot axis independent of rotation of the left wheel support member, the left wheel support arm, and the left front caster wheel about the left support member pivot axis.

2. The system of claim 1,
wherein the right wheel positioning arm comprises a threaded linkage configured to be rotated in a first direction to cause lengthening of the right wheel positioning arm and rotated in a second direction to cause shortening of the right wheel positioning arm, and
wherein the left wheel positioning arm comprises a threaded linkage configured to be rotated in a first direction to cause lengthening of the left wheel positioning arm and rotated in a second direction to cause shortening of the left wheel positioning arm.

3. The system of claim 1,
wherein the right front caster wheel is configured to swivel about a vertically oriented right caster axis and to rotate about a horizontally oriented right axle axis, and
wherein the left front caster wheel is configured to swivel about a vertically oriented left caster axis and to rotate about a horizontally oriented left axle axis.

4. The system of claim 1,
wherein the right wheel positioning system is configured to enable adjustment of positioning of the right front caster wheel in front of cutting blades of the ZTR riding mower system such that the right front caster wheel is configured to encounter grass to be cut ahead of a first portion of the cutting blades in a first position and is configured to encounter grass to be cut ahead of a second portion of the cutting blades in a second position, and
wherein the left wheel positioning system is configured to enable adjustment of positioning of the left front caster wheel in front of cutting blades of the ZTR riding mower system such that the left front caster wheel is configured to encounter grass to be cut ahead of a first portion of the cutting blades in a first position and is configured to encounter grass to be cut ahead of a second portion of the cutting blades in a second position.

5. The system of claim 1,
wherein the right wheel support member comprises a portion of the frame weldment of the frame system, and
wherein the left wheel support member comprises a portion of the frame weldment of the frame system.

6. A riding mower system, comprising:
a right front wheel;
a left front wheel;
a right rear drive wheel configured to be selectively driven into rotation by a right drive unit;
a left rear drive wheel configured to be selectively driven into rotation by a left drive unit; and
a frame system comprising:
a frame weldment;
a front wheel positioning system configured to enable adjustment of lateral positioning of the right front wheel and adjustment of a lateral positioning of the left front wheel, the front wheel positioning system comprising:
a right wheel support arm;
a right wheel support member; and
a right wheel positioning arm having an adjustable length, the right wheel positioning arm having a proximal end pivotally coupled to the right wheel support member and a distal end pivotally coupled to the right wheel support arm,
wherein:
a first end of the right wheel support arm is coupled to the right front wheel,
a second end of the right support arm is pivotally coupled to the right support member by way of a right support arm wheel pivot that defines a vertically oriented right wheel pivot axis,
the right wheel support arm and the right front wheel are configured to rotate together about the wheel pivot axis responsive to adjustment of the length of the right wheel positioning arm,
the right wheel support member pivotally coupled to the frame weldment by way of a right support member pivot that defines a horizontally oriented right support member pivot axis, and
the right wheel support member, the right wheel support arm, and the right front wheel configured to rotate together about the right support member pivot axis;
a left wheel support arm;
a left wheel support member; and
a left wheel positioning arm having an adjustable length, the left wheel positioning arm having a proximal end pivotally coupled to the left wheel support member and a distal end pivotally coupled to the left wheel support arm,
wherein:
a first end of the left wheel support arm is coupled to the left front wheel,
a second end of the left support arm is pivotally coupled to the left support member by way of a left support arm wheel pivot that defines a vertically oriented left wheel pivot axis, and
the left wheel support arm and the left front wheel are configured to rotate together about the wheel pivot axis responsive to adjustment of the length of the left wheel positioning arm,
the left wheel support member pivotally coupled to the frame weldment by way of a left support member pivot that defines a horizontally oriented left support member pivot axis, and
the left wheel support member, the left wheel support arm, and the left front wheel configured to rotate together about the left support member pivot axis, wherein the left support member pivot axis is distinct from the right support member pivot axis, and wherein the right wheel support member, the right wheel support arm, and the right front wheel are configured to rotate together about the right support member pivot axis independent of rotation of the left wheel support member, the left wheel support arm, and the left front wheel about the left support member pivot axis.

7. The system of claim 6, wherein the right wheel positioning arm comprises a threaded linkage configured to be rotated in a first direction to cause lengthening of the right wheel positioning arm and rotated in a second direction to cause shortening of the right wheel positioning arm, and wherein the left wheel positioning arm comprises a threaded linkage configured to be rotated in a first direction to cause lengthening of the left wheel positioning arm and rotated in a second direction to cause shortening of the left wheel positioning arm.

8. The system of claim 6, wherein the right front wheel comprises a caster wheel configured to swivel about a vertically oriented right caster axis and to rotate about a horizontally oriented right axle axis, and wherein the left front wheel comprises a caster wheel configured to swivel about a vertically oriented left caster axis and to rotate about a horizontally oriented left axle axis.

9. The system of claim 6, wherein the right wheel positioning system is configured to enable adjustment of positioning of the right front wheel in front of cutting blades of the riding mower system such that the right front wheel is configured to encounter grass to be cut ahead of a first portion of the cutting blades in a first position and is configured to encounter grass to be cut ahead of a second portion of the cutting blades in a second position, and wherein the left wheel positioning system is configured to enable adjustment of positioning of the left front wheel in front of cutting blades of the riding mower system such that the left front wheel is configured to encounter grass to be cut ahead of a first portion of the cutting blades in a first position and is configured to encounter grass to be cut ahead of a second portion of the cutting blades in a second position.

10. The system of claim 6, wherein the right wheel support member comprises a portion of the frame weldment of the frame system, and wherein the left wheel support member comprises a portion of the frame weldment of the frame system.

11. The system of claim 6, wherein the riding mower system comprises a zero-turn radius (ZTR) riding mower system.

12. A mower system, comprising:

a front wheel positioning system configured to enable adjustment of lateral positioning of front wheels of the mower system, the front wheel positioning system comprising:

a wheel support arm;
a wheel support member; and
a wheel positioning arm having an adjustable length, the wheel positioning arm having a proximal end configured to couple to the wheel support member and a distal end configured to couple to the wheel support arm, a first end of the wheel support arm configured to couple to a front wheel of the mower system, a second end of the support arm configured to couple to the support member by way of a support arm wheel pivot that defines a wheel pivot axis, the wheel support arm and the front wheel are configured to rotate together about the wheel pivot axis responsive to adjustment of the length of the wheel positioning arm, the wheel support member configured to pivotally couple to a frame weldment of the mower system by way of a support member pivot that defines a horizontally oriented support member pivot axis, and the wheel support member, the wheel support arm, and the front wheel are configured to rotate together about the support member pivot axis, a second wheel support arm;
a second wheel support member; and
a second wheel positioning arm having an adjustable length, the second wheel positioning arm having a proximal end configured to couple to the second wheel support member and a distal end configured to couple to the second wheel support arm, a first end of the second wheel support arm is configured to couple to a second front wheel of the mower system, a second end of the second support arm is configured to couple to the second support member by way of a second support arm wheel pivot that defines a second wheel pivot axis, the second wheel support arm and the second front wheel are configured to rotate together about the second wheel pivot axis responsive to adjustment of the length of the second wheel positioning arm, the second wheel support member configured to pivotally couple to the frame weldment of the mower system by way of a second support member pivot that defines a horizontally oriented second support member pivot axis, and the second wheel support member, the second wheel support arm, and the second front wheel are configured to rotate together about the second support member pivot axis, wherein the second support member pivot axis is distinct from the support member pivot axis, and wherein the wheel support member, the wheel support arm, and the front wheel are configured to rotate together about the support member pivot axis independent of rotation of the second wheel support member, the second wheel support arm, and the second front wheel about the second support member pivot axis.

13. The system of claim 12, wherein the proximal end of the wheel positioning arm is configured to pivotally couple to the wheel support member, and wherein the distal end of the wheel positioning arm is configured to pivotally couple to the wheel support arm.

14. The system of claim 12, wherein the wheel pivot axis is vertically oriented.

15. The system of claim 12, wherein the wheel positioning arm comprises a threaded linkage configured to be rotated in a first direction to cause lengthening of the wheel positioning arm and rotated in a second direction to cause shortening of the wheel positioning arm.

16. The system of claim 12,
wherein the front wheel comprises a caster wheel configured to swivel about a vertically oriented caster axis and to rotate about a horizontally oriented axle axis.

17. The system of claim 12,
wherein the wheel positioning system is configured to enable adjustment of positioning of the front wheel in front of cutting blades of the riding mower system such that the front wheel is configured to encounter grass to be cut ahead of a first portion of the cutting blades in a first position and is configured to encounter grass to be cut ahead of a second portion of the cutting blades in a second position.

18. The system of claim 12,
wherein the wheel support member comprises a portion of the frame weldment of the frame system.

19. The system of claim 12, wherein the riding mower system comprises a zero-turn radius (ZTR) riding mower system.

20. A zero-turn radius (ZTR) riding mower system, comprising:
    a front wheel positioning system configured to enable adjustment of lateral positioning of front wheels of the ZTR riding mower system, the front wheel positioning system comprising:
    a wheel support arm; and
    a wheel support member,
    a first end of the wheel support arm coupled to a front wheel of the ZTR riding mower system,
    a second end of the wheel support arm pivotally coupled to the wheel support member by way of a support arm wheel pivot that defines a vertically oriented wheel pivot axis,
    the wheel support member pivotally coupled to a frame member of the ZTR riding mower system by way of a support member pivot that defines a horizontally oriented support member pivot axis,
    the wheel support arm and the front wheel configured to rotate together about the wheel pivot axis relative to the wheel support member, and
    the wheel support member, the wheel support arm, and the wheel configured to rotate together about the support member pivot axis relative to the frame member,
    a second wheel support arm; and
    a second wheel support member,
    a first end of the second wheel support arm coupled to a second front wheel of the ZTR riding mower system,
    a second end of the second wheel support arm pivotally coupled to the second wheel support member by way of a second support arm wheel pivot that defines a second vertically oriented wheel pivot axis,
    the wheel support member pivotally coupled to the frame member of the ZTR riding mower system by way of a second support member pivot that defines a horizontally oriented second support member pivot axis,
    the second wheel support arm and the second front wheel configured to rotate together about the second wheel pivot axis relative to the second wheel support member, and
    the second wheel support member, the second wheel support arm, and the second wheel configured to rotate together about the second support member pivot axis relative to the frame member,
    wherein the second support member pivot axis is distinct from the support member pivot axis, and
    wherein the wheel support member, the wheel support arm, and the front wheel are configured to rotate together about the support member pivot axis independent of rotation of the second wheel support member, the second wheel support arm, and the second front wheel about the second support member pivot axis.

\* \* \* \* \*